United States Patent [19]

Chambers

[11] 4,352,505

[45] Oct. 5, 1982

[54] STRADDLE MOUNT TRAILER COUPLER

[75] Inventor: James W. Chambers, Rockford, Ill.

[73] Assignee: Atwood Vacuum Machine Company, Rockford, Ill.

[21] Appl. No.: 212,698

[22] Filed: Dec. 3, 1980

[51] Int. Cl.³ .............................................. B60D 1/06
[52] U.S. Cl. .................................... 280/495; 280/511
[58] Field of Search ................... 280/495, 155, 511 R, 280/512, 513, 500, 504, 501, 789

[56] References Cited

U.S. PATENT DOCUMENTS

| | | | |
|---|---|---|---|
| 2,392,063 | 1/1946 | Reimann et al. | 280/511 |
| 2,799,921 | 7/1957 | Knop et al. | 280/511 |
| 2,824,754 | 2/1958 | Bolmes et al. | 280/512 |
| 3,794,356 | 2/1974 | Hollis, Jr. | 280/513 |
| 3,797,850 | 3/1974 | Stout et al. | 280/495 |
| 3,830,580 | 8/1974 | Slattery et al. | 280/512 |
| 3,891,231 | 6/1975 | Snoberger et al. | 280/789 |

FOREIGN PATENT DOCUMENTS 447971  4/1948  Canada .............................. 280/511

Primary Examiner—Richard A. Bertsch
Assistant Examiner—Donn McGiehan
Attorney, Agent, or Firm—Leydig, Voit, Osann, Mayer & Holt, Ltd.

[57] ABSTRACT

A trailer coupler includes mounting wings which straddle and are welded to the outer sides of the webs of I-beams which form the A-frame tongue of the trailer. A tongue projects rearwardly from the coupler into the space between the webs and is welded to the inner sides of the webs to increase the load-carrying capacity of the coupler.

6 Claims, 4 Drawing Figures

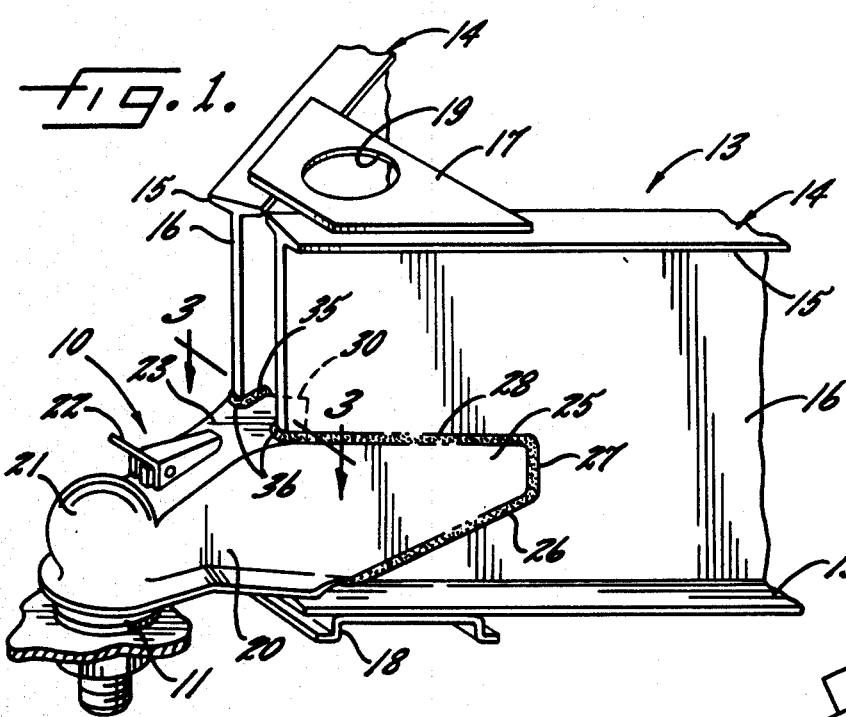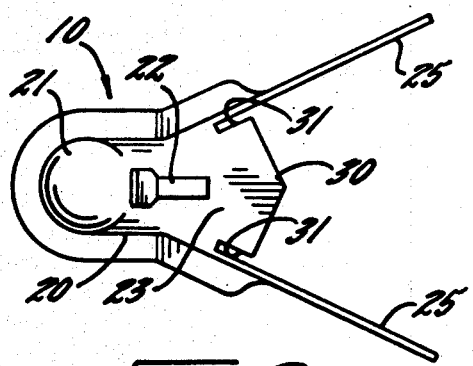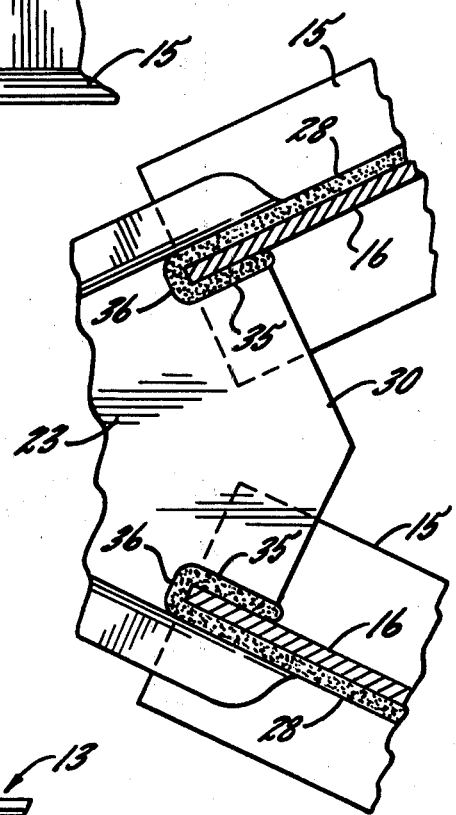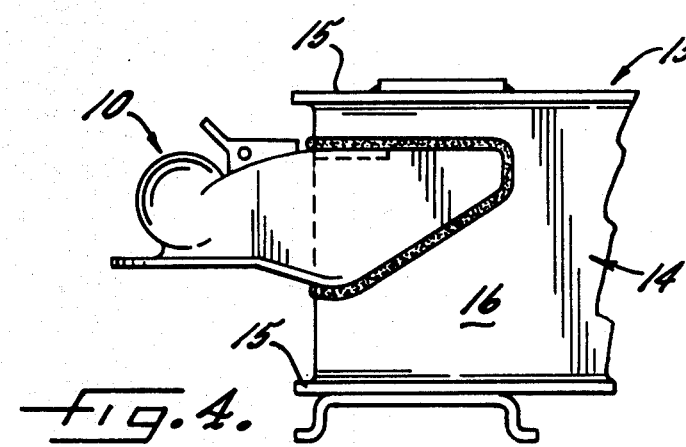

STRADDLE MOUNT TRAILER COUPLER

BACKGROUND OF THE INVENTION

This invention relates to a coupler adapted to be secured rigidly to the forward end of a trailing vehicle and adapted to connect the trailing vehicle to a hitch ball on a towing vehicle. More particularly, the invention relates to a coupler for a trailing vehicle such as a mobile home or the like having a frame which includes a pair of upright plates whose forward ends are spaced laterally from one another. In many instances, the plates are formed by the webs of a pair of forwardly converging I-beams which constitute the A-frame tongue of the trailing vehicle and which include upper and lower flanges.

The invention has more particular reference to a so-called straddle mount coupler in which a pair of wings project rearwardly from the body of the coupler. The wings straddle the outer sides of the plates and are secured thereto by welding or the like. A straddle mount coupler is disclosed in Hollis, Jr. U.S. Pat. No. 3,794,356.

SUMMARY OF THE INVENTION

The general aim of the present invention is to provide a new and improved heavy duty straddle mount coupler which is capable of being fastened more securely to the frame of the trailing vehicle so as to increase the load-carrying capacity of the coupler or, conversely, to enable a coupler of given capacity to be manufactured at lower cost.

A more detailed object is to achieve the foregoing by providing a coupler having a unique tongue which projects rearwardly between the wings and into the space between the frame plates to enable the coupler to be welded to the inner sides of the plates and thereby provide a connection of increased strength between the coupler and the frame.

These and other objects and advantages of the invention will become more apparent from the following detailed description when taken in conjunction with the accompanying drawings.

BRIEF DESCRIPTION OF THE DRAWINGS

FIG. 1 is a perspective view showing a coupler incorporating the features of the present invention attached to the tongue of a trailing vehicle.

FIG. 2 is a top plan view of the coupler.

FIG. 3 is an enlarged fragmentary cross-section taken substantially along the line 3—3 of FIG. 1.

FIG. 4 is a side elevational view which shows the coupler in a different location on the frame of the trailing vehicle.

DETAILED DESCRIPTION OF THE PREFERRED EMBODIMENT

As shown in the drawings for purposes of illustration, the invention is embodied in a coupler 10 for releasably connecting a trailing vehicle to a hitch ball 11 on a towing vehicle. The trailing vehicle may, by way of example, be a mobile home having a frame or tongue 13. In this particular instance, the tongue is of the A-frame type and is formed by a pair of forwardly converging I-beams 14 each having upper and lower flanges 15 connected by an upright plate or web 16, the forward ends of the two webs being spaced laterally from one another. Upper and lower mounting plates 17 and 18 extend across and are secured to the flanges of the beams and are formed with alined openings 19 for receiving a jack (not shown).

The coupler 10 includes a body 20 stamped from heavy gage sheet metal and formed with a downwardly opening socket 21 near its forward end. The socket is adapted to telescope over the hitch ball 11 and is adapted to be clamped releasably to the ball by conventional mechanism (not shown). A lever 22 for actuating the clamping mechanism is pivotally mounted on the coupler body 20 adjacent the upper side 23 thereof.

Two laterally spaced and rearwardly diverging wings 25 are formed integrally with and project rearwardly from the body 20 and are adapted to straddle the webs 16 of the beams 14. The wings diverge rearwardly at the same angle that the webs converge forwardly and thus the inner sides of the wings lie in face-to-face relation with the outer sides of the webs. Each wing is generally V-shaped and preferably is secured to the outer side of the web by a continuous fillet weld having a portion 26 (FIG. 1) extending rearwardly along the lower margin of the wing, a portion 27 extending upwardly along the rear margin of the wing, and a portion 28 extending forwardly along the upper margin of the wing.

In accordance with the present invention, a tongue 30 projects rearwardly from the coupler body 20 and is welded to the inner sides of the webs 16 of the beams 14. By virtue of the tongue 30, a connection of increased strength is established between the coupler 20 and the beams 14 to increase the load-carrying capacity of the coupler.

More specifically, the tongue 30 is formed integrally with the body 20 and projects rearwardly from the upper side 23 thereof into the space between the webs 16 of the beams 14. The outer edges of the tongue 30 are spaced laterally from and extend parallel to the inner sides of the wings 25 and thus substantially U-shaped slots 31 (FIG. 2) are formed between the tongue and the wings, the closed ends of the slots being defined by the rear margin of the upper side 23 of the body 20. When the coupler 10 is installed on the beams 14, the outer ends of the webs 16 abut the closed ends of the slots 31 while the inner sides of the webs lie in face-to-face relation with the outer edges of the tongue 30.

In keeping with the invention, the inner side of each web 16 is joined to the adjacent margin of the tongue 30 by a fillet weld 35 (FIG. 3) which extends along the upper side of the tongue. In addition, the outer end of each web is joined to the body 20 by a fillet weld 36 extending along the upper side 23 of the body adjacent the closed end of the slot 31. The welds 35 and 36 and the weld portion 28 preferably are formed as a single continuous weld.

By virtue of the tongue 30 and the welds 35 and 36, the coupler 10 is secured to the beams 14 with a connection whose strength is greater than is the case when the wings 25 are merely welded to the outer sides of the webs 16. Accordingly, the coupler can withstand heavier loads. Alternatively, the tongue 30 and the welds 35 and 36 enable a coupler of a given load capacity to be made with lighter gage wings so as to reduce the manufacturing cost of the coupler.

As shown in FIGS. 1 and 4, the straddle mount coupler 10 is versatile in that it can be attached to the beams 14 adjacent either the lower or upper flanges 15 of the beams or, if desired, can be mounted at any elevation along the beams. Thus, the same coupler can serve either as a top mounted coupler or a bottom mounted coupler.

I claim:

1. A coupler for connecting a trailing vehicle to a hitch ball on a towing vehicle, the trailing vehicle having a frame which includes a pair of forwardly projecting upright plates spaced laterally from one another at their forward ends, said coupler comprising a body having a downwardly opening socket at the forward end portion thereof for receiving said ball, a pair of laterally spaced wings projecting rearwardly from said body and straddling said plates with the inner sides of said wings lying in face-to-face relation with the outer sides of said plates, means for securing said wings to said plates, a generally horizontal tongue located between said wings and projecting rearwardly from said body into the space between said plates, and welds extending along the outer margins of said tongue and the inner sides of said plates and joining said tongue to said plates.

2. A coupler as defined in claim 1 in which said means comprise welds extending along the upper and lower margins of said wings and securing said wings to the outer sides of said plates, and welds extending laterally across the forward ends of said plates and securing the forward ends of said plates to the upper side of said body.

3. A coupler as defined in claim 1 in which a substantially U-shaped slot is defined between the inner side of each wing and the adjacent margin of said tongue, the forward end portions of said plates being received within said slots with the forward edges of said plates abutting the closed ends of said slots, and laterally extending welds joining the forward edges of said plates to the closed ends of said slots along the upper side thereof.

4. A coupler for connecting a trailing vehicle to a hitch ball on a towing vehicle, the trailing vehicle having a frame which includes a pair of forwardly converging I-beams, each of said I-beams having upper and lower horizontally extending flanges and having a web extending vertically between said flanges, the forward ends of said webs being spaced laterally from one another, said coupler comprising a body having a downwardly opening socket at the forward end portion thereof for receiving said ball, a pair of rearwardly diverging wings projecting rearwardly from said body and lying in face-to-face relation with the outer side of said webs, a generally horizontal tongue located between said wings and projecting rearwardly from the upper side of said body into the space between said webs, and fillet welds joining the upper and lower margins of said wings to the outer sides of said webs, joining the upper side of said body to the forward ends of said webs and joining the upper side of said tongue to the inner sides of said webs along the outer margins of said tongue.

5. A coupler for connecting a trailing vehicle to a hitch ball on a towing vehicle, said coupler comprising a body having an upper side and having forward and rear ends, a downwardly opening socket at the forward end portion of said body for receiving said ball, a pair of laterally spaced wings disposed in upright planes and projecting rearwardly from said body, a generally horizontal tongue located between and spaced laterally from said wings and projecting rearwardly from said body, there being generally U-shaped slots located between said wings and said tongue.

6. A coupler as defined in claim 5 in which said wings diverge from one another as the wings progress rearwardly, the outer margins of said tongue also diverging rearwardly with each margin extending substantially parallel to the adjacent wing.

* * * * *